United States Patent Office 3,554,017
Patented Jan. 12, 1971

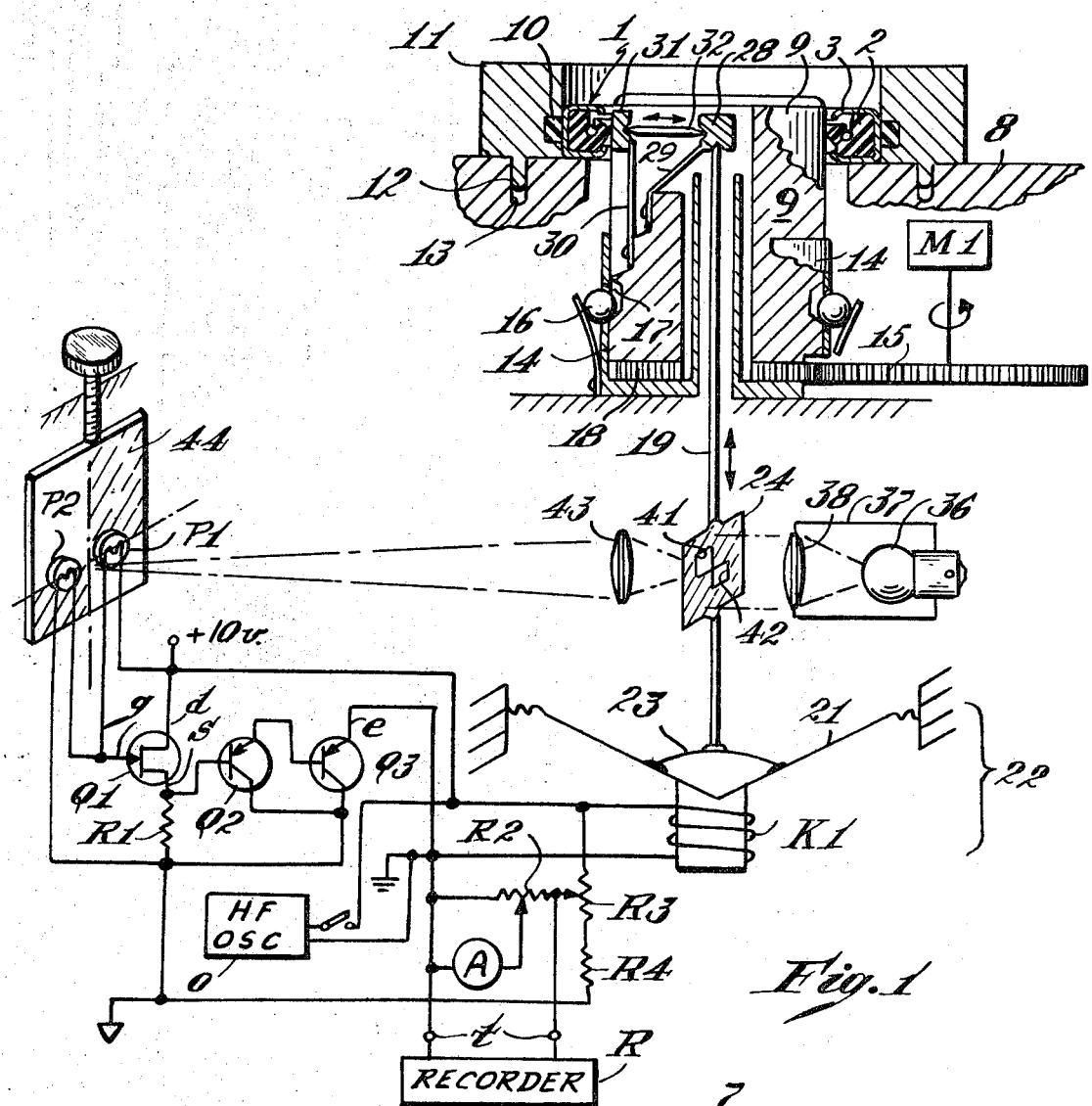
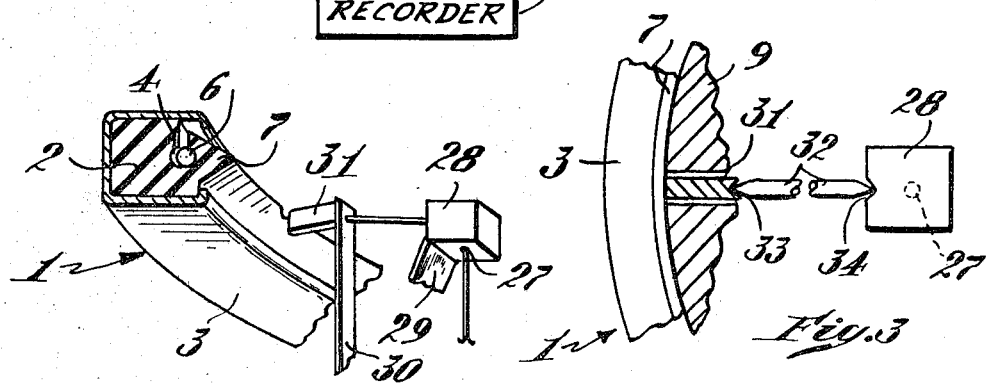
Fig. 1
Fig. 2
Fig. 3
Inventor
William O. Wernsing

3,554,017
ELECTROMECHANICAL APPARATUS FOR DETECTING IRREGULARITIES IN A BODY
William O. Wernsing, % Williams Laboratories, Inc., 125 Northview Road, Ithaca, N.Y. 14850
Filed Nov. 15, 1968, Ser. No. 776,203
Int. Cl. G01n 3/48
U.S. Cl. 73—81      13 Claims

ABSTRACT OF THE DISCLOSURE

Apparatus for sensing irregularities such as surface flaws or internal non-uniformities which appear at the surface of a body such as at the lip of a shaft sealing ring comprises a contact which is pressed against the lip toward a point beyond the lip while being rotated around the lip. Deflections of the contact away from the point caused by an irregularity are transmitted through a compression linkage to a photoelectric deflection detector which generates a deflection signal. The signal is applied to a loudspeaker cone which, through the linkage, tends to correct the contact deflection. The signal is also used to indicate the amplitude of the deflection.

---

This invention relates broadly to the art of sensing and measuring the surface characteristics of solid and, particularly, elastic bodies and of such internal or surface non-uniformities as are manifested at the surface. For example, elastomeric sealing rings are made with an inwardly facing annular lip designed to make a circular oil seal around a shaft. But the lip may exert non-uniform pressure on the shaft due to external nicks or internal material or spring pressure discontinuities. Ordinary surface roughness measuring apparatus is designed to detect smoothness irregularities on relatively rigid bodies and cannot reliably detect minute surface deformations or internal anomalies manifested by non-uniform pressures around the ring, such non-uniformities being the cause of imperfect shaft seals.

The object of the present invention is to provide pressure sensitive irregularity detection apparatus which responds very sensitively to such irregularities.

According to the invention apparatus for detecting irregularities in a body appearing at the surface thereof comprises a moving mechanism including a contact yieldingly urged against the surface and moved when the contact is deflected by the pressure of the body, a detector responsive to deflection of said mechanism to produce a control signal proportional to said deflection, a motor coupled to said mechanism and responsive to said signal to cause movement of the mechanism substantially equal and opposite to said deflection, and output means from said detector carrying said signal as a measure of the magnitude of the pressure.

For the purpose of illustration a typical embodiment of the invention is shown in the accompanying drawing, in which:

FIG. 1 is a schematic diagram of electromechanical apparatus for inspecting shaft seal rings;

FIG. 2 is a fragmentary isometric view of mechanical details of the mechanism; and FIG. 3 is a plan view of the mechanism of FIG. 2.

As shown in the figures a typical body to be tested by the present apparatus is a shaft oil seal 1 comprising a rubber or like elastomer ring 2 enclosed in an annular metal channel 3. The rubber ring 2 has an internal channel 4 occupied by a garter 6 which in use presses the inwardly tapered lip 7 of the ring against a cylindrical shaft. In the apparatus the ring to be tested is placed on a table 8 around a hollow, rotary mandrel 9 extending above the table. An annular weight 11 resting on the table has depending pins 12 fitting in sockets 13 in the table to hold the ring stationary. A rubber annulus 10 inside the weight frictionally engages the sealing ring to hold it coaxially of the mandrel 9 against rotation with the mandrel.

The mandrel is removably attached in a cup 14 by spring-urged detent balls 16 engaging in annular grooves 17 around the mandrel. The cup thus may receive mandrels of other upper diameters for receiving other sized sealing rings. The mandrel has a gear 18 fixed at its bottom and engaged by a like gear 15 driven by a motor M1. In operation the mandrel is rotated on an axis fixed by the cup 14.

Within the mandrel is an axial passage through which a rod 19 extends coaxially of the axis of rotation of the mandrel. The rod 19 is attached to the cone 21 of a loudspeaker 22 by a copper disk 23, the cone being driven by a voice coil K1. The rod carries an optical mask 24. The upper end of the rod has a point bearing with a butt joint in a conical recess 27 in a coupling block 28 which is pivoted in the mandrel by a leaf spring 29. A contact finger 31 is similarly pivoted to the mandrel by a leaf spring 30. The finger is about 1/16 to 1/8 inch in width with an arcuate nose concentric with the mandrel. The contact finger extends through a small opening in the wall of the mandrel into contact with the sealing ring and responds to the pressure of irregularities appearing at the inner circumferential surface of the ring by movement or deflection radially of the mandrel. A pointed needle 32, bearing with a butt joint in conical recesses 33 and 34 of the contact and block respectively, connects the contact and block. The contact spring 30 is relatively long and vertical to allow radial movement of the contact relative to the mandrel. The coupling block spring 29 is preferably at an angle of 45° or more with respect to the mandrel axis to cause it to have a substantial vertical component of movement axially of the mandrel. The mechanism described is kept under compression to hold the rod and pin continuously under compression with zero play. Preferably the moving parts are of low mass and application of bending moments to the compression elements, pin 32 and rod 19, are avoided, as by the pointed butt joints at their ends. The vertical rod 19 should, however, have high compliance horizontally so as not to transmit any horizontal force component to the needle 32 due to misalignment of the rod with the coupling block or the mandrel axis. Such a force would contribute a spurious sinusoidal motion to the mechanism as the mandrel is rotated.

When the sealing ring 1 is placed on the mandrel, the lip of the rubber ring 2 is stretched across the finger 31 in the opening of the mandrel, as herein after described with respect to static testing, and applies pressure to the contact finger 31, deflecting it very slightly inwardly from its normal or zero pressure position, that is, at a point tangent to or on the circumference of the mandrel which it occupied prior to placement of a sealing ring. The contact finger when thus urged very slightly inwardly by the pressure of the ring tends to move very slightly outwardly into nicks or soft spots in the ring, or ride very slightly inwardly over protuberances or hard spots. That is, with a nick, the finger tends to move toward the mandrel circumference position from which it was slightly deflected radially inwardly by the ring. With a protuberance, the finger tends to move radially inwardly from the mandrel circumference position.

The contact block 31 of the mechanism so far described scans the lip 7 of the sealing ring 1, as the mandrel 9 is rotated by the motor M1, and moves inwardly or outwardly at a joint in the garter 6, internal rubber irregularities, surface nicks or protuberances, and the like. Inward movement of the block 31 is translated by the coupling block 28 into vertical reciprocation of the rod 19 against upward pressure from the diaphragm 21.

Adjacent the mask 24 on the rod is a lamp 36 in a barrel 37 having a lens 38 directing the lamp rays on the mask. The mask has two rectangular apertures 41 and 42 disposed in diametrically opposed quadrants. A lens 43 projects an image of the mask on two photocells P1 and P2 (Clairex type CL905HL) carried on a vertically adjustable frame 44 and connected between a positive supply (+10 v.) and a power return or floating ground. Normally, that is with the arcuate nose of the contact finger 31 tangent to the mandrel periphery and with zero radial pressure, the images of the mask apertures illuminate the photocells equally and the voltage drop across each is substantially equal. Adjustment of the tangency of the finger and mandrel is accomplished by raising or lowering the frame 44, when for example a substituted mandrel has shifted the normal position of the contact finger. In operation deflection of the contact finger and the mask unbalances illumination and voltage drop of the photocells.

The voltages across photocells P1 and P2 are applied respectively between the drain $d$ and gate $g$ of a field effect transistor Q1 (type 2N3069A) and between gate $g$ of the transistor Q1 and floating ground. The unbalance or difference between the two photocell voltages appears as an error signal across a 5.6 kilohm resistor R1 connected between the source $s$ and floating ground. The error signal is amplified by a two-stage, linear power amplifier comprising two transistors Q2 (type 2N2905) and Q3 (type 2N3792). The second-stage Q3 is connected through the voice coil K1 to the positive supply +10 v. such that, when an error signal is amplified, power is supplied to the coil in polarity to drive the diaphragm 21 and mask 24 almost back to a position restoring balance of the photocell voltages. The output signal is taken from a bridge circuit in which the voice coil and Q3 form one leg and R3 (100 ohm potentiometer) and R4 (820 ohms) form the other leg. The bridge output, taken between Q3 emitter and the arm on R3 is nulled at the normal or zero pressure position of the contact finger 31 by adjusting the arm position on R3. Output meter A (100 microampere) sensitivity is adjusted by R2 (1 kilohm).

The unbalance signal applied to the voice coil is linearly proportional to the deflection of the contact finger 31. This analog voltage is available at meter A or at output terminals $t$ to a recorder R or like instrument with which irregularities around the ring under test are indicated.

The meter or recorder may be calibrated by applying a known force to the contact finger which has previously been set for zero force position as described above. Such a known force may be provided by a plunger sliding in a tube and urged by a long, somewhat compressed spring slightly out of the tube. The plunger is pressed against the contact finger until the tube abuts the adjacent walls of the mandrel. The plunger and spring will then have been deflected and a force applied to the contact finger by a repeatable amount which can be correlated with the graduations on the meter or recorder. Since the resulting output voltage at terminals $t$ is a linear function of the applied force, only one calibration point is required in addition to the zero force setting.

Should the operation of the apparatus indicate that friction or hysteresis in the moving parts is limiting sensitivity, a switch S1 may be closed to connect a high-frequency, low-power oscillator O to the voice coil. The high-frequency current of the oscillator imparts a minute vibration to the mechanism and speaker cone to eliminate static friction and nullify hysteresis effects.

While the mandrel has been described as rotating the contact finger to scan the entire lip of the ring, a meaningful static test can be performed without rotation. If a ring is placed in the balanced apparatus, it will stretch in fitting over the mandrel applying temporary pressure to the contact finger. Subsequent relaxation of the rubber and the resultant decrease in pressure is measured in the manner described yielding information on the performance characteristic of the rubber.

From the foregoing description it can be seen that the present apparatus can measure the force of a body with extremely small displacement of the contact finger owing to the counterforce applied by the diaphragm. Since the contact head is always driven back toward balance condition irregularities and compensation due to high displacement are avoided. The mechanical linkage between contact and diaphragm is constantly under pressure allowing no play between the pin or rod and other coupled elements. The loudspeaker is inexpensive, linear and highly suited for mounting the mask of the sensitive photoelectric system, and readily adapted to friction reduction by high-frequency oscillation.

While certain desirable embodiments of the invention have herein been illustrated and described, it is to be understood that these are mainly by way of example, and the invention is broadly inclusive of any and all modifications falling within the scope of the appended claims.

I claim:

1. Apparatus for detecting irregularities in a body appearing at the surface thereof comprising:
   a movable mechanism including a contact yieldingly urged against the surface of and toward a point beyond the surface of said body and moved when the contact is deflected away from said point by changes in the pressure of the body,
   a detector responsive to deflection of said mechanism to produce a control signal proportional to said deflection,
   a motor coupled to said mechanism and responsive to said signal to cause movement of the mechanism almost equal and opposite to said deflection, and
   output means from said detector carrying said signal as a measure of the magnitude of the pressure.

2. Apparatus according to claim 1 characterized by drive means for producing relative motion of the contact along the surface.

3. Apparatus according to claim 2 wherein said drive means is rotational and characterized by a reciprocating linkage between said contact and motor disposed coaxially of said rotation.

4. Apparatus according to claim 2 for detecting irregularities at the inner surface of a sealing ring wherein said drive means comprises a hollow rotating mandrel and said mechanism includes a contact mounted on the mandrel to move radially of the mandrel, a rod coupled to said motor and disposed to reciprocate coaxially of the mandrel, and a coupling transmitting contact movement through an angle to said rod.

5. Apparatus according to claim 1 wherein said detector produces an electrical signal and said motor comprises a loudspeaker with a voice coil electrically connected to said detector and a cone mechanically coupled to said mechanism.

6. Apparatus according to claim 1 characterized by a linkage between said contact and motor, said linkage including a compression element in butting contact with another element.

7. Apparatus according to claim 3 wherein said detector variably biases said motor to hold said linkage continuously under controlled restoring pressure substantially reducing the deflection of said contact by the pressure of the body.

8. Apparatus according to claim 6 wherein said detector biases said motor to hold said linkage continuously under pressure substantially reducing the deflection of said contact by the pressure of the body.

9. Apparatus according to claim 1 characterized by a light source and means carried by said mechanism to deflect a light beam from said source, and wherein said detector comprises photoelectric means responsive to deflection of said beam to produce an electrical signal controlling said motor.

10. Apparatus according to claim 3 characterized by a hollow cylindrical support detachably connected to said drive means, said contact being movably mounted on said support and said reciprocating linkage including a reciprocating rod butt-jointed in the linkage coaxially of the cylinder.

11. Apparatus according to claim 5 characterized by a high frequency oscillator connected to said voice coil to produce a low amplitude vibration of said mechanism.

12. Apparatus for detecting irregularities at the inner circumference (7) of an elastomeric sealing ring (2) comprising
   a hollow mandrel (9) carrying a coaxial gear (18), a cup-shaped receptacle (14) for the mandrel having a spring detent (16) holding the mandrel,
   drive means (M1, 15) engaging the mandrel gear to rotate the mandrel,
   means (11) to hold the sealing ring stationary around the mandrel,
   a contact finger (31) projecting through the mandrel into contact with the inner circumferential surface of the sealing ring and pivotally (30) mounted in the mandrel to move radially of the mandrel in response to the changed pressure of a body irregularity,
   a coupling block (28) pivotally mounted in the mandrel inwardly of the finger and having, in response to movement of the block, a component of movement axially of the mandrel,
   a pin (32) compressed between the finger and coupling block,
   a loudspeaker (22) having a voice coil (K1) and a cone (21) driven thereby,
   a rod (19) compressed between said diaphragm and block coaxially of the mandrel and disengageable from the block by removal of the mandrel from the cup,
   a light source (36),
   means (24) on said rod for deflecting a light beam from said source,
   photoelectric means (P1, P2) responsive to deflection of said beam to produce an electrical signal proportional to deflection of said finger, rod and beam deflecting means, and including means (Q1, Q2, Q3) to apply the signal to said voice coil in amplitude to cause said diaphragm to oppose and almost equal the pressure of said body irregularity.

13. Apparatus according to claim 12 characterized by a high-frequency oscillator connected to said voice coil to produce a low-amplitude vibration of said mechanism.

References Cited
UNITED STATES PATENTS 2,929,147  3/1960  Hall _____ 33—174(Q)
3,073,033  1/1963  Dega _____ 33—174(Q)

SAMUEL S. MATTHEWS, Primary Examiner

U.S. Cl. X.R.

33—174